May 24, 1955

A. H. HUELSMAN 2,709,236

MOTOR CONTROL SYSTEM

Filed May 5, 1954

Inventor:
Arthur H. Huelsman,
by J. Wesley Hauber
His Attorney.

Fig. 2.

A.C. OPERATION

MASTER SWITCH POSITIONS

| DEVICES | HOIST | | | | | | OFF | LOWER | | | | | |
|---|---|---|---|---|---|---|---|---|---|---|---|---|---|
| | 6 | 5 | 4 | 3 | 2 | 1 | OFF | 1 | 2 | 3 | 4 | 5 | 6 |
| 61 | | ● | ○ | ○ | ○ | ○ | | ○ | ○ | ○ | ● | | |
| 62 | ● | ○ | ○ | ○ | ○ | ○ | | ○ | ○ | ○ | ○ | ● | |
| 63 | ● | ○ | ○ | ○ | ○ | ○ | | ○ | ○ | ○ | ○ | ○ | ● |
| 20 | | | | | | | | | | | | | |
| 56 | | | | | | ○ | | | | | | | |
| 54 | ○ | ○ | ○ | ○ | ○ | ○ | | ○ | ○ | ○ | ○ | ○ | ○ |
| 55 | ○ | ○ | ○ | ○ | ○ | ○ | | ○ | ○ | ○ | ○ | ○ | ○ |
| 53 | ○ | ○ | ○ | ○ | ○ | ○ | | ○ | ○ | ○ | ○ | ○ | ○ |
| H | ○ | ○ | ○ | ○ | ○ | ○ | | | | | | | |
| L | | | | | | | | ○ | ○ | ○ | ○ | ○ | ○ |
| 31 | ○ | ○ | ○ | ○ | ○ | | | | ○ | ○ | ○ | ○ | ○ |
| 76 | ○ | ○ | ○ | ○ | ○ | | | | ○ | ○ | ○ | ○ | ○ |
| 32 | ○ | ○ | ○ | ○ | | | | | | ○ | ○ | ○ | ○ |
| 77 | ○ | ○ | ○ | ○ | | | | | | ○ | ○ | ○ | ○ |
| 33 | ○ | ○ | ○ | | | | | | | | ○ | ○ | ○ |
| 78 | ○ | ○ | ○ | | | | | | | | ○ | ○ | ○ |
| 34 | ○ | ○ | | | | | | | | | | ○ | ○ |
| 79 | ○ | ○ | | | | | | | | | | ○ | ○ |
| 35 | ○ | | | | | | | | | | | | ○ |
| 36 | ● | | | | | | | | | | | | ● |

D.C. DYNAMIC BRAKING OPERATION

MASTER SWITCH POSITIONS

| DEVICES | HOIST | | | | | | OFF | LOWER | | | | | |
|---|---|---|---|---|---|---|---|---|---|---|---|---|---|
| | 6 | 5 | 4 | 3 | 2 | 1 | OFF | 1 | 2 | 3 | 4 | 5 | 6 |
| 61 | | | | | | | | | | | | | |
| 62 | | | | | | | | | | | | | |
| 63 | | | | | | | | | | | | | |
| 20 | | ○ | ○ | ○ | ○ | ○ | | ○ | ○ | ○ | ○ | ○ | |
| 56 | | | | | | | ○ | | | | | | |
| 54 | | | | | | | ○ | | | | | | |
| 55 | | | | | | | ○ | | | | | | |
| 53 | | | | | | | ○ | | | | | | |
| H | | | | | | | | | | | | | |
| L | | | | | | | | | | | | | |
| 31 | | | ○ | ○ | ○ | ○ | | ○ | ○ | ○ | ○ | | |
| 76 | ○ | ○ | ○ | ○ | ○ | ● | | ● | ○ | ○ | ○ | ○ | ○ |
| 32 | | | | ○ | ○ | ○ | | ○ | ○ | ○ | | | |
| 77 | ○ | ○ | ○ | ○ | ● | | | | ● | ○ | ○ | ○ | ○ |
| 33 | | | | ○ | ○ | | | ○ | ○ | | | | |
| 78 | ○ | ○ | ○ | ● | | | | | | ● | ○ | ○ | ○ |
| 34 | | | | | ○ | | | ○ | | | | | |
| 79 | ○ | ○ | ● | | | | | | | | ● | ○ | ○ |
| 35 | | | | | | | | | | | | | |
| 36 | | | | | | | | | | | | | |

BRAKING CHART ASSUMES THAT PUSH BUTTON 120 IS DEPRESSED WHILE MASTER SWITCH IS IN POSITION 6

CHARTS ASSUME THAT MASTER SWITCH IS MAINTAINED IN INDICATED POSITION FOR SUFFICIENT TIME TO PERMIT DROP-OUT OF ALL DEENERGIZED DEVICES

○ = ENERGIZED AND OPERATED INSTANTLY UPON ENERGIZATION

● = DEENERGIZED AND DROPPING OUT WITH TIME DELAY

Inventor:
Arthur H. Huelsman,
by J. Wesley Haulser
His Attorney.

United States Patent Office 2,709,236
Patented May 24, 1955

2,709,236

MOTOR CONTROL SYSTEM

Arthur H. Huelsman, Altamont, N. Y., assignor to General Electric Company, a corporation of New York Application May 5, 1954, Serial No. 427,837

17 Claims. (Cl. 318—203)

This invention relates to a motor control system, and more particularly, to a control system for an alternating current motor of the type used in hoist drives and the like.

In certain applications, such as mine hoist drives, the driving motor may be required to drive a load in either direction of motor rotation, and this load may at times overhaul the motor during movement in either of these directions. To meet the load and speed requirements of such a drive, certain prior arrangements have utilized a wound rotor induction motor provided with means for dynamically braking the motor in either direction of rotation. An effective method of obtaining such dynamic braking is by disconnecting the stator winding of the motor from its alternating current supply and then exciting the winding with direct current. Previously, in order to effectively control such dynamic braking in either direction of motor operation, it generally has been found necessary to provide a control system which requires two master switches. In such systems, one of the master switches is movable to vary the acceleration of the motor during normal A.-C. excitation and one of the master switches is movable to vary the dynamic braking effort applied to the motor during D.-C. excitation. In a hoist drive, these individual master switches are under the manual control of an operator, and as a result, the operator is frequently required to shift his hand from the operating lever of one master switch to the operating lever of the other master switch. Since the operator's full attention is usually required elsewhere, the need for such involved manipulation is obviously undesirable.

To obviate the need for this undesirable manipulation of the separate operating levers of the master switches, it has heretofore been proposed to interrelate the two master switches by a mechanical interlock scheme which would permit one-lever control of the two master switches. Such interlock schemes are, of themselves, costly and complex and still do not eliminate the necessity for more than one master switch.

Accordingly, it is a primary object of this invention to provide, for a reversible A.-C. motor, a control system which requires only a single master switch to carry out the combined function of accelerating the motor in either direction during A.-C. excitation and of varying the dynamic braking effort during D.-C. excitation.

In order to avoid confusion on the part of the operator, his movement of the single manually-controlled master switch should effect a response by the driving motor which is logically and consistently related to the positions of the master switch. For example, when the master switch is moved from the "off" position, occupied when the motor is de-energized, into the "hoist" zone disposed at one side of the "off" position, the motor should accelerate in a direction to provide hoisting action. Similarly when the master switch is moved from "off" into the "lower" zone disposed at the other side of the "off" position, motor should accelerate in a direction to provide lowering. If it is desired to dynamically brake the motor, movement of the master switch toward "off" position should produce the desired dynamic braking. It should be unnecessary to move the switch in a direction away from "off" in either zone in order to produce dynamic braking, as has been necessary in certain prior arrangements. Such movement away from "off" logically seems to the operator as carrying out an accelerating action rather than the desired dynamic braking action. Accordingly, confusion, especially to an inexperienced operator, is likely to result if such master switch movement is necessary.

It is therefore another object of this invention to construct the motor control system in such a manner that dynamic braking of the motor may be controlled by the operator's moving the master switch in a direction toward its "off" position.

In carrying out the invention in one form, the novel control system includes an A.-C. motor provided with means for selectively exciting the motor from a D.-C. dynamic braking source. Connected in circuit with its secondary winding, the motor has a resistor which can be progressively varied by sequentially closing a series of normally-open secondary contactors. These contactors are sequentially closable to accelerate the motor during A.-C. excitation and to progressively brake the motor during D.-C. excitation. A master switch is forwardly movable from an "off" position to an operating position, whereby to sequentially close said secondary contactors during A.-C. excitation. To collectively open all of the secondary contactors and to connect the motor to the D.-C. dynamic braking source, there is provided selectively-operable control means. The dynamic braking closing action of the secondary contactors during D.-C. excitation is controlled by the sequential drop-out of a series of dynamic braking relays which had been previously picked up in response to accelerating movement of the master switch in a direction away from the "off" position. Sequential drop-out of the dynamic braking relays is effected by movement of the master switch toward "off" position. A deceleration control circuit, which is effective when operative to sequentially close the secondary contactors in response to sequential drop-out of the dynamic braking relays, is normally maintained inoperative, but is rendered operative in response to operation of the selectively-operable control means. Thus when the selectively-operable control means is operated, D.-C. excitation is provided for the motor, the secondary contactors are collectively opened, and the deceleration control circuit becomes operative to produce sequential closing of the secondary contactors in response to movement of the master switch toward "off" position. As a result, this movement of the master switch toward "off" position is effective to progressively dynamically brake the motor.

For a better understanding of my invention, reference should now be had to the following specification and accompanying drawing.

Figure 1:
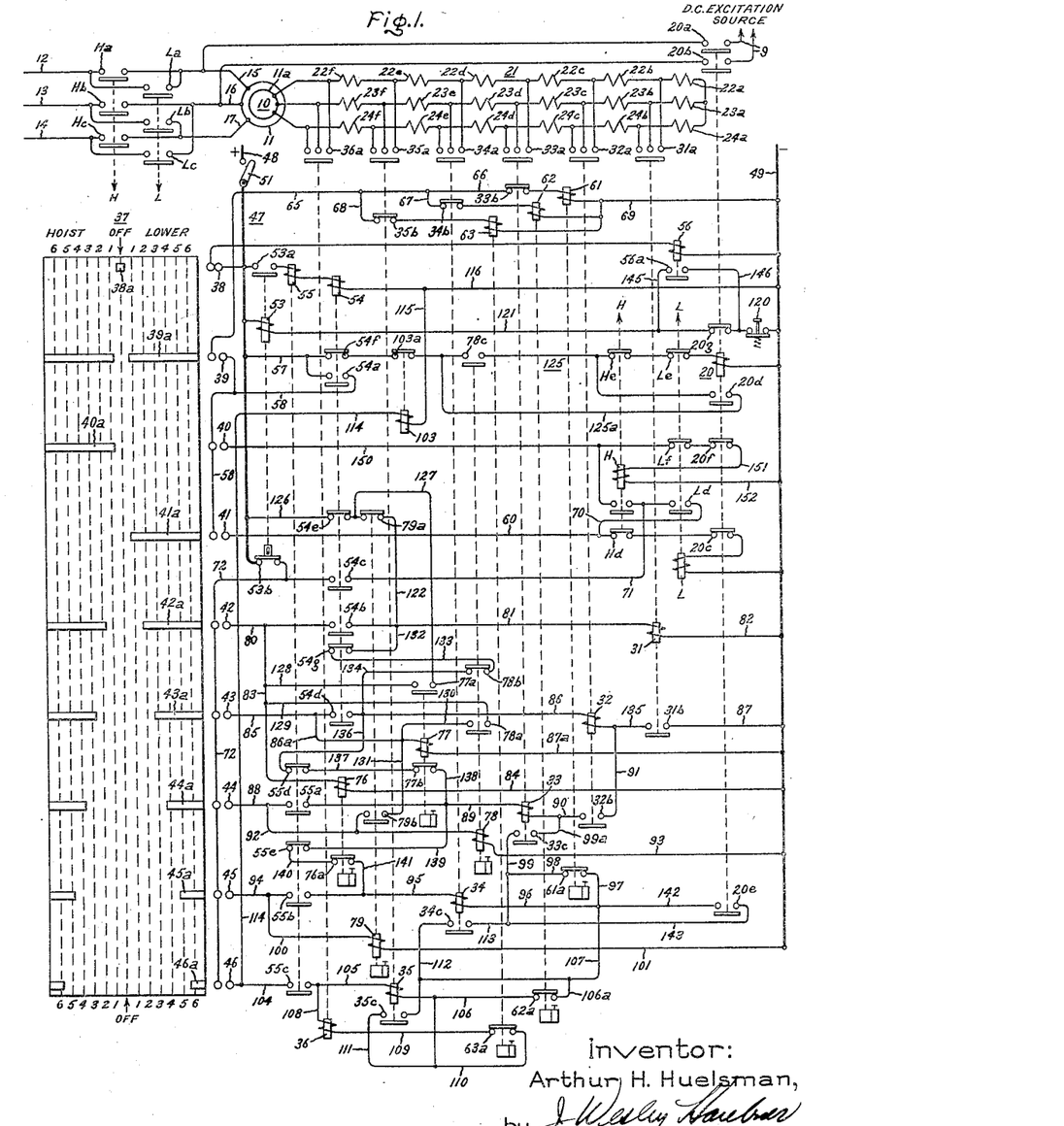
Fig. 1 of this drawing is a diagrammatic view of one form of control system embodying my invention.

Referring to Fig. 1, I have shown a control system for a polyphase wound-rotor induction motor 10 to be used as the driving motor for a hoist. To simplify the drawing so as to facilitate an understanding of my invention, I have omitted most of the protective devices such as circuit breakers, limit switches, and undervoltage responsive devices, which would normally be provided in such a system. Additionally, for simplicity I have omitted the usual mechanical brake and its control devices, which are operable under certain conditions to retard or prevent movement of the rotor of hoist motor 10.

As seen in Fig. 1, this motor 10 has a primary winding 11 arranged to be connected to the supply lines 12, 13, and 14 of a three phase power source. The primary winding 11 has three terminals 15, 16, and 17. For causing the hoist motor 10 to exert a torque in a direction to assist in lowering a load, the terminals 15, 16, and 17 are respectively connected to supply lines 12, 14, and 13 by closing the normally-open contacts La, Lb, Lc of a lowering contactor L. Alternatively, for causing the motor 10 to exert a torque in a direction tending to hoist a load, the connections from the terminals 16 and 17 to the supply lines 13 and 14 are reversed by closing of the normally-open contacts Ha, Hb, and Hc of a hoist contactor H. For the purposes of simplifying the drawing, the contacts Ha, Hb, and Hc of the hoist contactor H are schematically shown as broken away from the armature and coil of the contactor, but it is to be understood that the parts corresponding to the two arrows H shown in Fig. 1 are actually physically interconnected. In a corresponding manner, the parts of the L contactor schematically respresented by the two arrows L are actually physically interconnected.

For dynamically braking the motor, there is provided a suitable source of excitation, such as the D. C. source indicated at the top of Fig. 1, which can be selectively connected across the terminals 15 and 16 of the primary winding 11. To this end, there is provided a dynamic braking contactor 20 having normally-open contacts 20a and 20b closable to connect the supply lines 9 of the D. C. source to the primary terminals 15 and 16. To assure that the primary winding 11 is always disconnected from the A. C. supply lines 12, 13, and 14 when the dynamic braking contacts 20a, 20b are closed, there is provided suitable interlock means, which will be described hereinafter.

The motor 10 has a secondary winding 11a connected through slip rings to a network comprising a Y-connected resistor 21 having three branches 22, 23, 24, each of which is divided into six resistance sections a, b, c, d, e, and f, which are referred by using these letters as subscripts to the reference numeral of the corresponding branch. For example, the branch 22 comprises the resistance sections 22a, 22b, 22c, 22d, 22e, and 22f. For accelerating the motor during A. C. excitation of the primary winding 11, the resistance of secondary resistor 21 is progressively decreased by means of secondary contactors sequentially-operable to progressively short circuit sections of the resistor. For example, in Fig. 1 I have shown six secondary contactors 31, 32, 33, 34, 35, and 36 sequentially-operable by means described in greater detail hereinafter. Contactor 31 has normally-open contacts 31a closable to short circuit resistance sections 22a, 23a, and 24a. Contactor 32 has normally-open contacts 32a closable to short circuit additional resistance sections 22b, 23b, and 24b. Contactor 33 has normally-open contactors 33a closable to short circuit addition resistance sections 22c, 23c, and 24c. Additional resistance sections 22d, 23d, and 24d can be short circuited by closing contact 34a of contactor 34; resistance section 22e, 23e, and 24e by closing contacts 35a of contactor 35; and resistance sections 22f, 23f, and 24f by closing contacts 36a of contactor 36. Although I have shown six of these secondary contactors, it is to be understood that a fewer or greater number of these contactors may be used without departing from the spirit of my invention.

For controlling the sequential operation of the accelerating contactors 31—36, there is provided a manually-operable master switch 37 of the multi-position, reversing type. For accelerating the motor in a lowering direction, the master switch 37 is movable from an "off" or motor-de-energized position through six successive lowering positions in a "lower" zone. For accelerating the motor in a hoisting direction, the master switch 37 is movable from "off" position through six successive hoisting positions in a "hoist" zone. For progressively increasing the dynamic braking effort applied to the motor under D. C. excitation conditions, the master switch 37 is movable toward "off" position from the hoisting or lowering position which it occupied when dynamic braking became necessary. These various positions are designated by legends applied at the top and bottom of the master switch 37. The master switch 37 contains switches designated by numerals from 38—46, which are respectively operated by cams designated by numerals from 38a to 46a. These cam-operated switches 38—46 control the operation of the various motor control contactors, such as 31—36, H, and L, in a manner which will appear more clearly hereinafter. Although I have shown the master switch as being of the cam-operated type, it will be apparent that other types of master switches, such as the drum or brush type, may be used instead.

For controlling the various motor control contactors in response to operation of the cam switches 38—46 of the master switch 37, there is provided a control circuit 47 having supply lines 48 and 49 connected to a suitable source of D. C. control power. This D. C. control power source (not shown) can be in the form of a motor-generator set or a rectifier. As an alternative, alternating control power may be used provided that rectification be supplied for timing relays 61—63 and 76—79, to be described hereinafter.

It is believed that the control circuit 47 can be best understood from a description of the operation of the system as a whole. Accordingly, such a description of the system will now be carried from the normal non-operative position, in which the master switch 37 is in "off" position, through a normal accelerating sequence, at the termination of which the motor is operating at full speed with the master switch in a position 6. With the master switch in position 6, I will then describe how the hoisting engineer may initiate and control the following motor functions: reduced motoring effort, coasting, and dynamic braking. To facilitate an understanding of the system, I will first describe certain operations in general terms, after which I will trace the specific control circuits involved in these operations.

*"Off" position*

The system of Fig. 1 is shown in a de-energized condition with the master switch in its "off" position, and the control power switch 51 in open position. Power is assumed to be available on the polyphase supply lines 12, 13, 14, on the D.-C. supply lines 9, and on the control power supply lines 48, 49. To prepare the system for operation, the control power switch 51 must first be closed. Closing of this switch 51 energizes a dynamic braking transfer relay 53 which picks up and closes its contacts 53a thereby energizing and picking up a pair of series connected control relays 54 and 55. In addition, closing of control power switch 51 energizes and picks up a second dynamic braking transfer relay 56 through the then-closed cam switch 38, whereby to close the contacts 56a of the second dynamic braking transfer relay.

*Acceleration: Position 1—lower*

Assume first that the hoisting engineer desires to accelerate the motor in a direction to aid in lowering a load. He will then move the master switch 37 to operating position 1 in the lower zone. This movement of the master switch opens the cam switch 38 thereby dropping out braking transfer relay 56. The movement also closes cam switch 41 thereby energizing and picking up the main lower contactor L. When the lower contactor L picks up, its contacts La, Lb, Lc close, thereby connecting the primary winding 11 of the motor in circuit with the polyphase source of power in such a manner as to cause the motor to be driven in a lowering direction. Since all of the secondary contactors 31—36 are then de-energized, their contacts 31a—36a will then be open, and therefore, maximum resistance will then be connected in circuit with the secondary winding 11a. Accordingly, when the master switch is in position 1—lower, the motor 10 will drive at its lowest torque in a lowering direction.

Movement of the master switch into position 1—lower also closes cam switch 39 to energize and pick up a chain of accelerating relays 61, 62, and 63. Each of these accelerating relays picks up instantly. As will appear more clearly hereinafter, each of the relays 61, 62, and 63, is retarded in dropping out by suitable means such as a dashpot or magnetic flux decay means. This time-delay dropout characteristic is utilized during a subsequent portion of the accelerating cycle to prevent the secondary contacts 34a—36a from being closed in too rapid a sequence when responding to movement of the master switch 37 into positions 5 and 6. The function of this type of accelerating relay in providing uniform accelerating peaks in the speed of the motor is well understood in this art.

*Specific circuits traced.*—The above generally-described energizing circuit for the lower contactor L may be traced from supply line 48, through conductor 57, the then-closed contacts 54a, conductor 58, cam switch 41, conductor 60, contacts Hd of the hoist contactor, contacts 20c of the dynamic braking contactor, through the coil of the lower contactor L, and then to the other supply line 49. The contacts 20c of the braking contactor 20 provide an interlock means which insures that the lower contactor L will not be energized if the dynamic braking contactor 20 is concurrently energized and picked up.

The above generally-described energization of the chain of accelerating relays 61, 62, and 63 is effected by a circuit which extends from supply line 48, through conductor 57, through the then-closed contacts 54a, conductor 58, the then-closed cam switch 39, conductor 65, through the parallel branches 66, 67, and 68 which contain the coils of the accelerating relays, then through conductor 69 to the other supply line 49.

*Acceleration: Position 2—lower*

Further acceleration of the motor 10 may be obtained by moving the master switch from position 1—lower to position 2—lower. This movement closes the cam switch 42 thereby energizing and picking up the accelerating contactor 31, whereby to close the contacts 31a and, thus, short circuit resistance sections 22a, 23a, and 24a. This short circuiting of the resistance sections lowers the resistance of the resistor 21 and thereby accelerates the motor.

In addition to picking up contactor 31, this movement of the master switch also energizes and picks up a dynamic braking relay 76. This dynamic braking relay 76 is one of a chain of dynamic braking relays 76, 77, 78, and 79. Each of these dynamic braking relays is capable of picking up instantly but is retarded in dropping out, as by magnetic flux decay means or by a dashpot. The function of this chain of dynamic braking relays will appear more clearly when the dynamic braking operation is described.

*Specific circuits traced.*—The above circuit for the accelerating contactor 31 may be traced from the closed cam switch 41, which is then connected to the supply line 48, through the conductor 60, through conductor 70, the then-closed contacts Ld, through the conductor 71, contacts 54c, conductor 72, cam switch 42, conductor 80, contacts 54b, conductor 81, then through the coil of contactor 31, through conductor 82, to the other supply line 49.

The above energizing circuit for dynamic braking relay 76 extends through closed cam switch 42, conductor 80, conductor 83, the coil of dynamic braking relay 76, conductor 84, and then to the supply line 49.

*Acceleration: Position 3—lower*

Further acceleration of the motor may be obtained by moving the master switch from position 2—lower to position 3—lower. This movement closes the cam switch 43 and thereby completes an energizing circuit for the secondary contactor 32. Completion of this energizing circuit picks up the contactor 32 and closes the contacts 32a whereby to short circuit the additional resistance sections 22b, 23b, and 24b. This further lowers the resistance of secondary resistor 21 and thereby further accelerates the motor 10. In addition to energizing the contactor 32, closing of the cam switch 43 also energizes and picks up an additional dynamic braking relay 77.

*Specific circuits traced.*—The above energizing circuit for the secondary contactor 32 may be traced through the closed switch 43, conductor 85, closed contacts 54d, conductor 86, the coil of the secondary contactor 32, closed contacts 31b, conductor 87, and then to the supply line 49.

The energizing circuit for the dynamic braking relay 77 may be traced from the closed switch 43, through the conductor 85, conductor 85a, the coil of the dynamic braking relay 77, conductor 87a and then to the line 49.

*Acceleration: Position 4—lower*

Further acceleration of the motor may then be obtained by moving the master switch from position 3—lower to position 4—lower. This movement closes the cam switch 44 and thereby completes an energizing circuit for an additional secondary contactor 33. Completion of this energizing circuit closes the contacts 33a thereby short circuiting additional resistance sections 22c, 23c, and 24c. This further reduces the resistance of secondary resistor 21 thereby further accelerating the motor 10.

Energization of accelerating contactor 33 additionally opens its contacts 33b, thereby interrupting the energizing circuit for the accelerating relay 61, which has a time-delayed drop-out characteristic. This accelerating relay 61 has contacts 61a which must be closed before any of the additional accelerating contactors 34—36 may be closed. Since these contacts 61a remain open until the accelerating relay 61 drops out, it is apparent that no further acceleration of the motor may be effected until expiration of the time period required for drop-out of the accelerating relay. Thus, if the master switch 37 is moved rapidly through position 4 into position 5 before the accelerating relay 61 has dropped out, no additional contactor will be closed until the relay 61 drops out. Thus, the presence of accelerating relay 61 makes it necessary that at least a predetermined period of time expire before the next succeeding accelerating contactor 34 can be operated.

In addition to energizing contactor 33, this movement into master switch position 4—lower energizes and picks up another dynamic braking relay 78.

*Specific circuits traced.*—The above generally-described energizing circuit for the secondary contactor 33 extends through closed cam switch 44, conductor 88, contacts 55a, conductor 89, the coil of the secondary contactor 33, conductor 90, contacts 32b, conductors 91 and 135, contacts 31b, conductor 87, and then to the supply line 49.

The above generally-described energizing circuit for the dynamic braking relay 78 extends from the closed switch 44, through conductor 88, conductor 92, the coil of the dynamic braking relay 78, conductor 93, and then to the supply line 49.

*Acceleration: Position 5—lower*

Further acceleration of the motor 10 may then be obtained by moving the master switch from position 4—lower to position 5—lower. This movement closes the cam switch 45 and thereby completes an energizing circuit for an additional secondary contactor 34. Completion of this circuit picks up the secondary contactor 34 thereby closing its contact 34a whereby to short circuit additional resistance sections 22d, 23d, and 24d. This further reduces the resistance of the secondary resistor 21 thereby further accelerating the motor 10.

In addition to picking up the secondary contactor 34, closing of the cam switch 45 also picks up an additional dynamic braking relay 79.

Energization of secondary contactor 34 additionally opens its contacts 34b, thereby interrupting the energizing circuit for the accelerating relay 62, which has a time-delay drop-out characteristic. This accelerating relay 62 has contacts 62a which must be closed before any of the additional accelerating contactors 35 and 36 may be closed. Since these contacts 62a remain open until the accelerating relay 62 drops out, it is apparent that no further acceleration of the motor may be affected until expiration of the time period required for drop out of the accelerating relay 62. Thus, if the master switch 37 is moved rapidly through position 5 into position 6 before the accelerating relay 62 has dropped out, no additional contactor will be closed until the relay 62 drops out. Thus, the presence of accelerating relay 62 makes it necessary that at least a predetermined period of time expires before the next succeeding accelerating contactor 35 can be operated.

*Specific circuits traced.*—The above generally-described energizing circuit for the accelerating contactor 34 extends through the closed cam switch 45, conductor 94, contacts 55b, conductor 95, the coil of the accelerating contactor 34, conductors 96 and 97, the then-closed contacts 61a, conductors 98 and 99, contacts 33c, conductors 99a and 90, contacts 32b, conductors 91 and 135, contacts 31b, conductor 87, and then to line 49.

The above generally-described energizing circuit for the dynamic braking relay 79 extends through the closed cam switch 45, conductor 94, conductor 100, the coil of the dynamic braking relay 79, the conductor 101, and then to the supply line 49.

Acceleration: Position 6—lower

Further acceleration of the motor may then be obtained by moving the master switch from position 5—lower to position 6—lower, which position may be termed a "full on" position. As soon as the time-delay drop-out relay 62 closes its contacts 62a, this movement of the master switch is effective to establish an energizing circuit for the accelerating contactor 35. Completion of this energizing circuit picks up the contactor 35 thereby closing the contacts 35a and, as a result, short circuiting the additional resistances 22e, 23e, and 24e. This further reduces the resistance of secondary resistor 21 and further accelerates the motor 10.

Energization of accelerating contactor 35 opens its contacts 35b, thereby interrupting the energizing circuit for the accelerating relay 63, which has a time-delayed drop-out characteristic. This accelerating relay 63 has contacts 63a which must be closed before the additional contactor 36 may be operated. Since these contacts 63a remain open until the accelerating relay 63 drops out, no further acceleration of the motor may be effected until expiration of the time period required for drop-out of the accelerating relay 63. As soon as the contacts 63a close, an energizing circuit is automatically established for the contactor 36. Establishment of this energizing circuit picks up the contactor 36 thereby closing its contacts 36a and short circuiting additional resistance sections 22f, 23f, and 24f. This further accelerates the motor.

In addition to energizing the contactors 35 and 36, closing of the cam switch 46 completes an energizing circuit for the blocking relay 103, the function of which will appear more clearly from the description of the coasting operation which follows.

*Specific circuits traced.*—The above generally-described energizing circuit for contactor 35 may be traced from the closed cam switch 46, through conductor 104, contacts 55c, conductor 105, the coil of the contactor 35, conductor 106, then-closed contacts 62a, conductors 106a, 107 and 97, contacts 61a, conductor 98, conductor 99, contacts 33c, conductors 99a and 90, contacts 32b, conductors 91 and 135, contacts 31b, conductor 87 and then to the supply line 49.

The above generally-described energizing circuit for the contactor 36 may be traced from the closed cam switch 46 through supply line 104, contacts 55c, conductor 108, through the coil of the contactor 36, conductor 109, contacts 63a, conductors 110 and 11, contacts 35c, conductor 112, contacts 34c, conductors 113 and 99, contacts 33c, conductors 99a and 90, contacts 32b, conductor 91 and 135, contacts 31b, conductor 87, and then to the supply line 49.

The energizing circuit for the blocking relay 103 extends from the closed cam switch 46, through the conductor 114, through the coil of the blocking relay, through conductors 115 and 116, to the supply line 49.

Acceleration summary

The above steps may be summarized by a brief description of the usual manner in which the hoisting engineer operates the control system in a lowering direction. For example, assume that the master switch 37 is in "off" position with the mechanical brake (not shown) set. As soon as the engineer releases this mechanical brake, he normally will rapidly move the master switch 37 through the lower zone into position 6—lower, in which position the switch ordinarily will remain for the entire motoring operation. This rapid movement of the master switch will cause the motor to accelerate at a predetermined rate, which is determined by the regulated sequential closing of the secondary or accelerating contactors 31 to 36. Contactors 31, 32, and 33 will be closed as slowly or as rapidly as the engineer moves the master switch through operating positions 1, 2, and 3. The additional contactors 34, 35, and 36 will be sequentially closed as rapidly as will be permitted by the chain of time-delayed accelerating relays 61, 62, 63 or as slowly as the engineer moves the master switch 37 through operating positions 4 and 5 into 6. At the end of the acceleration period, all of the secondary contactors 31—36 are closed, thereby short circuiting the motor secondary and causing it to operate at full speed. The motor normally will then continue to operate at full speed, as long as the master switch 37 remains in position 6.

As soon as the load approaches its landing, hoisting conditions may indicate that either reduced motoring effort, dynamic braking, or free-wheeling is necessary to complete the trip satisfactorily. A salient feature of the control system of this invention is its flexibility in permitting the engineer to initiate and control any of these functions by a simple manipulation of the master switch 37. The manner in which these functions are initiated and controlled will now be explained.

Reduced motoring effort

If reduced motoring effort is necessary when the motor is operating at full speed with the master switch in the "full-on" position 6, the engineer can retard the hoist by moving the master switch from position 6 toward "off" position. This causes secondary contactors to drop-out sequentially, thereby inserting increased resistance into circuit with the motor secondary winding 11a. This permits the motor to exert less motoring effort, thus allowing the load to retard the hoist.

Motoring effort may be reduced as quickly or as slowly as the operator moves the master switch. For example, when the master switch is moved from position 6 to position 5, the cam switch 46 opens, thereby interrupting the energizing circuits for the accelerating contactors 35 and 36. This interruption causes the contactors 35 and 36 to drop out instantly, thereby opening the contacts 35a and 36a and inserting resistance sections 22f, 23f, 24f, 22e, 23e, and 24e into the motor secondary.

When the master switch is moved from position 5 to position 4 under these conditions, cam switch 45 opens thereby dropping out secondary contactor 34 and inserting additional resistance into the motor secondary 11a.

If a further reduction in motoring effort is necessary, the engineer can move the master switch from position 4 to position 3 thereby opening cam switch 44 whereby to drop out secondary contactor 33. Continued movement of the master switch toward "off" position will open cam switch 43 thereby to drop out contactor 32 as the master switch passes through position 3, and will drop out the last secondary contactor 31 by opening cam switch 42 as the master switch passes through position 2 into position 1.

If at any time during this movement of the master switch toward "off" position, the engineer desires increased motoring effort, he may return the master switch toward position 6. This initiates the usual accelerating operation, which is effected by sequential closing of the secondary contactors 31—36 in the manner explained hereinabove.

It should be noted that the braking relays 79, 78, 77, and 76 are sequentially dropped out by the opening of respective cam switches 45, 44, 43, and 42 as the master switch 37 is moved from position 5 into position 1. This feature is of no particular importance in the matter of reducing the motoring effort, but is of special importance in the matter of dynamic braking. The importance of this feature will be pointed out with more particularity in the description of the dynamic braking operation, which soon follows.

Coasting

Assume again that the motor is operating at full speed with the master switch in position 6—lower. If the hoisting engineer wishes to initiate coasting, he may do so by depressing the selectively-operable push-button 120 while the master switch remains in position 6. This operation sets up the following action.

*General description.*—The energizing circuit for the primary contactor L is interrupted, thereby dropping out this contactor L and opening the then-closed contacts La, Lb, Lc. This removes power from the hoist motor 10, and thereby permits the motor to coast.

At the same time, all of the secondary contacts 31—36 are de-energized, causing their main contacts 31a—36a to open, thus inserting maximum resistance in the secondary 11a of the hoist motor 10. If the push-button 120 is released, while the master switch is still in position 6, the control operation is restored to the usual accelerating sequence previously described.

No dynamic braking occurs during this operation because the blocking relay 103 remains energized and therefore maintains its contacts 103a open, whereby to prevent energization of the series connected coil of the braking contactor 20.

*Specific description.*—The above generally-described interruption of the energizing circuit for the contactor L is effected as follows: Depressing the push-button 120 interrupts the energizing circuit for the transfer relay 53, thereby dropping out this relay 53 and opening its contacts 53a. Opening these contacts 53a de-energizes control relays 54 and 55 and as a result, opens contacts 54a. Opening of the contacts 54a interrupts the energizing circuit for L, which circuit includes the then-closed cam switch 41, conductor 58, contacts 54a, and conductor 57.

The above generally-described de-energization of all of the secondary contactors in response to depression of the push-button 120 is effected as follows: As explained in the immediately preceding paragraph, depression of the push-button 120 de-energizes and drops out transfer relay 53 and opens its contacts 53a whereby to effect de-energization and drop out of the control relays 54 and 55. However, prior to the instant the transfer relay contacts 53a open, another set of transfer relay contacts 53b are arranged to close. Although this overlapping relationship of the contacts 53a and 53b may be provided in any conventional manner, it is an important feature of the present system. For example, because the contacts 53b close before opening of the contacts 53a, and hence, the contacts 54c, control power is maintained on the dynamic braking relays 76—79, so that during this period, these relays all remain energized and, thus, are capable of performing their desired control functions. For example, the braking relays, by remaining energized during this period, render drop out of the control relays 54 and 55 effective to drop out the secondary contactors 31—36. For example, consider braking relay 79 whose contacts 79a remain open and, therefore, prevent the contactor 31 from being energized through the conductor 122 when the contacts 54e of the control relay 54 close. The other possible energization circuit for contactor 31 is through contacts 54b. Accordingly, when control relay 54 drops out and these contacts 54b open, all possible energizing circuits for contactor 31 are interrupted. Hence, dropping out of the control relay 54 interrupts all possible energizing circuits for contactor 31 and, as a result, causes the secondary contactor 31 to drop out, as desired.

The other secondary contactors 32—36 are similarly caused to drop out by dropping out of certain contacts of the control relays 54 and 55. For example, contactor 32 is dropped out by drop out of contacts 54d, contactor 33 by drop out of contacts 55a, contactor 34 by drop out of contacts 55b, and contactors 35 and 36 by contacts 55c.

Dynamic braking

It will be assumed again that the motor is operating at full speed with the master switch in position 6—lower. If the hoisting engineer wishes to initiate dynamic braking, he may do so by depressing the dynamic braking push-button 120 and simultaneously returning the master switch toward its "off" position. As the master switch is returned toward "off" through positions 5, 4, 3, and 2, dynamic braking torque is supplied by the hoist motor to progressively decrease the hoist speed.

Minimum speed is secured when the master switch is moved into position 1. As will appear more clearly hereinafter, the motor will be retarded as rapidly as will be permitted by the preset timing braking relays 76—79 or as slowly as the hoist operator moves his master switch 37.

The performance of the control circuit during this dynamic braking operation should become apparent from the following description.

Depression of the dynamic braking push-button 120, which is the first step in the dynamic braking operation immediately produces two important changes in the control circuit. (1) It effects de-energization and immediate opening of the contactor L, thereby removing A.-C. power from the hoist motor 10. (2) It effects de-energization and immediate opening of all of the secondary contactors 31—36, thereby inserting maximum resistance in circuit with the motor secondary winding 11a. The action of the relays and the circuits which produce these two changes have been set forth in detail in the above description of the coasting operation.

Moving the master switch from position 6 to position 5 while the push-button 120 is depressed, causes the dynamic braking contactor to be energized thereby to pick up and close its contacts 20a, 20b, and thus connect the primary winding 11 of the motor in a dynamic braking circuit with the D.-C. excitation source. The motor will then deliver braking torque as prescribed by the speed-torque characteristic of the motor with maximum resistance connected in its secondary 11a.

The specific manner in which the above movement of the master switch into position 5 effects operation of the braking contactor 20 is as follows: First consider the condition of the energizing circuit 125 for the braking contactor 20 after the push-button 120 has been depressed and prior to movement of the master switch into position 5. Control relay 54 has dropped out as explained in connection with the coasting operation. Accordingly, the contacts 54f of the control relay are then closed. Contactor L having already dropped out, contacts Le are then closed. Braking time relay 78 having picked up to close its contacts 78c during motor acceleration has remained energized during depression of the push-button 120, as explained in the coasting operation. Thus, it will seem that only the then-open contacts 103a of the blocking relay 103 are interrupting the energizing circuit 125 for braking contactor 20. Now when the master switch 37 is moved from position 6 into position 5, cam switch 46 opens and interrupts the energizing circuit 114—115—116 for the blocking relay 103 thereby dropping out the blocking relay 103 and closing its contacts 103a, which completes the energizing circuit 125 for the dynamic braking contactor 20. This energizing circuit 125 may be traced from one supply line 48, through conductor 57, contacts 54f, contacts 103a, contacts 78c, He, Le, through the coil of braking contactor 20 to the other supply line 49.

The push-button 120 may be released as soon as dynamic braking is initiated, since the dynamic braking contactor 20 seals itself closed by means of sealing contacts 20d which close to complete a seal-in circuit 125a shunting the contacts 78c of the braking relay 78.

Dynamic braking: Position 4—lower

Further reduction of speed may then be obtained by moving the master switch 37 from position 5—lower to position 4—lower. This movement opens the cam switch 45 and thereby interrupts the energizing circuit 94, 100, 101 for the coil of braking relay 79. The braking relay 79, having a definite time-delay drop-out characteristic, drops out after a predetermined period of time, thereby closing its contacts 79a so as to complete an energizing circuit 126, 54e, 79a, 122, 81, 82, for the coil of secondary contactor 31. Secondary contactor 31 immediately picks up, thereby closing its contacts 31a whereby to short circuit resistance sections 22a, 23a, and 24a. This lowers the resistance of secondary resistor 21 and, accordingly, shifts the motor operation to a second speed-torque braking characteristic curve which causes the motor to supply the braking torque to further decrease the hoist speed.

Dynamic braking: Position 3—lower

Further reduction in hoist speed may then be obtained by moving the master switch 37 from position 4—lower to position 3—lower, whereby to open the next cam switch 44. When this movement is completed, if the prior dynamic braking relay 79 has had sufficient time to drop out, then the opening of cam switch 44 is effective to de-energize the next dynamic braking relay 78. As a result, this braking relay 78 drops out after a predetermined time delay, thereby to close its contacts 78b and complete an energizing circuit for the next secondary contactor 32. Completion of this energizing circuit causes this contactor 32 immediately to pick up and close its contacts 32a whereby to further reduce the resistance of resistor 21. This shifts the motor operation to a third speed-torque braking characteristic curve, on which the motor operates to further reduce the hoist speed.

If the prior dynamic braking relay 79 has had insufficient time to drop out when the master switch is moved into position 3, the braking relay 78 will remain energized until drop out of this prior braking relay 79. When the prior relay 79 does drop out, however, its contacts 79b open to interrupt the last remaining energizing circuit for the braking relay 78. This, of course, drops out relay 78 after a predetermined time delay, which action is effective to close the contactor 32 and reduce the hoist speed, all in the manner explained in the preceding paragraph.

*Specific circuits traced.*—If the prior braking relay 79 had already dropped out when the master switch was moved into position 3, then the above generally-described energizing circuit for braking relay 78 is interrupted by the opening of cam switch 44. This energizing circuit extended from one supply line 48, through 53b, 72, 44, 88, 92, the coil of braking relay 78, 93, to the opposite supply line 49.

If the prior braking relay 79 drops out after the master switch is moved into position 3 then the sole remaining energizing circuit for braking relay 78 is interrupted by the opening of contacts 79b upon drop out of the prior braking relay 79. This circuit may be traced from supply line 48 to supply line 49 by the following path: 126, 54e, 127, 77a, 128, 83, 129, 78a, 130, 131, 79b, 92, the coil of braking relay 78, and 93. Thus, if the master switch is in position 3 when the prior dynamic braking relay 79 drops out and opens its contacts 79b, the coil of braking relay 78 is de-energized and this relay 78 drops out.

Drop out of dynamic braking relay 78 closes its contacts 78b whereby to complete the following energizing circuit for secondary contactor 32: from one supply line 48, through 126, 54e, 79a, 122, 132, 54g, 133, 78b, 134, 86, the coil of contactor 32, 135, 31b, and 87.

Dynamic braking: Position 2—lower

Still further reduction in hoist speed may then be obtained by moving the master switch 37 from position 3—lower to position 2—lower, whereby to open the next cam switch 43. When this movement is completed, if the prior dynamic braking relay 78 has had sufficient time to drop out, then the opening of cam switch 43 is effective to deenergize the next dynamic braking relay 77. As a result, this braking relay 77 drops out after a predetermined time delay, thereby to close its contacts 77b and complete an energizing circuit for the next secondary contactor 33. Completion of this energizing circuit causes this contactor 33 immediately to pick up and close its contacts 33a whereby to further reduce the resistance of resistor 21. This shifts the motor operation to a fourth speed-torque braking characteristic curve, on which the motor acts to further reduce the hoist speed.

If the prior dynamic braking relay 78 has had insufficient time to drop out when the master switch is moved into position 2, the braking relay 77 will remain energized until drop out of this prior braking relay 78. When the prior relay 78 does drop out, however, its contacts 78a open to interrupt the last remaining energizing circuit for the braking relay 77. This, of course, drops out relay 77 after a predetermined time delay, which action is effective to close the contactor 33 and reduce the hoist speed, all in the manner explained in the preceding paragraph.

*Specific circuits traced.*—If the prior braking relay 78 had already dropped out when the master switch was moved into position 2, then the energizing circuit for braking relay 77 is interrupted by the opening of cam switch 43. This energizing circuit extended from one supply line 48, through 53b, 72, 43, 85, 86a, the coil of braking relay 77, 87a to the other supply line 49.

If the prior braking relay 78 drops out after the master switch is moved into position 2, then the sole remaining energizing circuit for the braking relay 77 is interrupted by the opening of contacts 78a upon drop out of the prior braking relay 78. This circuit may be traced from supply line 48 to supply line 49 by the following path: 126, 54e, 127, 77a, 128, 83, 129, 78a, 130, the coil of braking relay 77, and 87a.

Drop out of dynamic braking relay 77 closes its contacts 77b whereby to complete the following energizing circuit for secondary contactor 33: from one supply line 48, through 126, 54e, 79a, 122, 132, 54g, 133, 78b, 134, 136, 55d, 137, 77b, 138, 89, the coil of contactor 33, 90, 32b, 91, 135, 31b, 87, to the other supply line 49.

Position 1

The lowest dynamic braking speed may be secured by moving the master switch 37 from position 2—lower to position 1—lower, whereby to open the next cam switch 42. When this movement is completed, if the prior dynamic braking relay 77 has had sufficient time to drop out, then the opening of cam switch 42 is effective to de-energize the next dynamic braking relay 76. As a result, this braking relay 76 drops out after a predetermined time delay, thereby to close its contacts 76a and complete an energizing circuit for the next secondary contactor 34. Completion of this energizing circuit causes this contactor 34 immediately to pick up and close its contacts 34a whereby to further reduce the resistance of resistor 21. This action places the motor on a fifth speed-torque braking characteristic curve to reduce the hoist speed to a minimum level.

If the prior dynamic braking relay 77 has had insufficient time to drop out when the master switch is moved into position 1, the braking relay 76 will remain energized until drop out of this prior braking relay 77. When this prior braking relay 77 does drop out, however, its contacts 77a open to interrupt the energizing circuit for the braking relay 76. This, of course, drops out relay 76 after a predetermined time delay, which action is effective to close the contactor 34 and to decrease the hoist speed, all in the manner explained in the preceding paragraph.

*Specific circuits traced.*—If the prior braking relay 77 had already dropped out when the master switch was moved into position 1, then the energizing circuit for braking relay 76 is interrupted by the opening of cam switch 42. This energizing circuit extended from one supply line 48, through 53b, 72, 42, 80, 83, the coil of braking relay 76, 84, and to the other supply line 49.

If the prior braking relay 77 drops out after the master switch is moved into position 1, then the sole remaining energizing circuit for the braking relay 76 is interrupted by the opening of contacts 77a upon drop out of the prior braking relay 77. This circuit may be traced from one supply line 48 to the other supply line 49 by the following path: 126, 54e, 127, 77a, 128, 83, the coil of braking relay 76, and 84.

Drop out of the dynamic braking relay 76 closes its contacts 76a and completes the following energizing circuit for secondary contactor 34: from one supply line 48, through 126, 54e, 79a, 122, 132, 54g, 133, 78b, 134, 136, 55d, 137, 77b, 138, 139, 55e, 140, 76a, 141, 95, the coil of contactor 34, 96, 142, 20e, 143, 99, 33c, 99a, 90, 32b, 91, 135, 31b, 87, to the other supply line 49.

"Off" position

To discontinue the dynamic braking operation, the hoisting engineer may then move the master switch from position 1—lower into its "off" position. This movement restores the circuit to a neutral condition by dropping out the dynamic braking contactor 20 and the then-energized secondary contactors 31, 32, 33 and 34.

The specific manner in which this neutralizing of the system is effected is as follows: movement of the master switch into "off" position open cams switches 41 and 39 and closes cam switch 38. The closing of cam switch 38 picks up transfer relay 56 thereby to close its contacts 56a, so as to shunt the then-open contacts 20g and complete an energizing circuit for transfer relay 53. This circuit extends from line 48, through the coil of transfer relay 53, conductor 121, shunt path 145, 56a, 146, push-button 120 to line 49. Pick up of transfer relay 53 closes its contacts 53a, thereby energizing and picking up the two control relays 55 and 54. When control relay 54 picks up, it opens its contacts 54f thereby to interrupt the energizing circuit for the braking contactor 20. Additionally, control relay 54 in picking up opens its contacts 54e. This removes all power from coils of the secondary contactors 31—34, thereby causing these contactors to drop out and restore maximum resistance to the motor secondary 11a.

Deceleration control circuit

By comparing the action of the various control devices during "reduced motoring effort" with the action of these devices during dynamic braking, an important feature of my control system will become apparent. More particularly, during either of these operations, as the master switch is moved toward "off" position, the braking relays 79—76 are sequentially dropped out. However, during the "reduced motoring effort" operation, the braking relays are ineffective to exert any control over the secondary contactors 31—36, whereas during the dynamic braking operation, the braking relays are effective to control the secondary contactors. This control function is imparted to the braking relays 79—76 by the drop out of control relay 54 when the push-button 120 is selectively depressed to initiate dynamic braking. More specifically, during "reduced motoring effort" the deceleration control circuit including 126, 54e, 79a, 122, 132, 54g, 133, 78b, 134, 136, 55d, 137, 77b, 138, 139, 55e, 140, 76a, 141 is inoperative to transmit control from the braking relays to the secondary contactors 31—34 since the contacts 54e are open. However, during dynamic braking, this deceleration control circuit is rendered operative by the closing of contacts 54e in response to selective operation of push-button 120. In such an operative condition, this deceleration control circuit is effective to produce sequentially closing of the contactors 31—34 in response to sequential drop out of the braking relays 79—76. As a result, return movement of the master switch toward "off" position during dynamic braking is effective to sequentially close the secondary contactors.

An additional significant feature of my control system is that it is capable of closing the secondary contacts 31—34 in the same predetermined sequence, i. e., 31, 32, 33, 34, for both acceleration and dynamic braking. Accordingly, the control system is capable of progressively decreasing the resistance of the secondary resistor 21 during each of these operations. This progressive decrease permits smooth acceleration during A.-C. excitation of the motor and smooth deceleration during dynamic braking.

The following descriptive paragraph should summarize the relationship set forth in the preceding paragraph together with certain other important operational relationships.

The energizing coils of the secondary contactors 31—36 may be considered as being disposed in branches of the control circuit 47 which are sequentially energized in response to movement of the master switch from "off" position through its drive positions. For example, the coil of contactor 31 is disposed in a branch 42, 80, 54b, 81, 82; the coil of contactor 32 in a branch 43, 85, 54d, 86, 135, 31b, 87; etc. and these branches are sequentially energized by the closing of a corresponding cam switch 42, 43, etc. as the master switch is moved from "off" through its drive positions. By depressing the push button 120 when the master switch is in a drive position, the engineer may selectively operate transfer means including the control relays 54, 55 so as to collectively deenergize all of these branches whereby to collectively open the secondary contactors. However, this operation of the control relays 54, 55 in response to depression of push-button 120 renders the deceleration control circuit 126, 54e, 79a, 122, 132, 54g, 133, 78b, 134, 136, 55d, 137, 77b, 138, 139, 55e, 140, 76a, 141 operative. In its operative condition, this deceleration control circuit is capable of rendering the braking relays 79—76 effective to sequentially energize the above circuit branches as these relays 79—76 sequentially drop out. Since movement of the master switch 37 toward its off position is effective to sequentially drop out these braking relays 79—76, it is apparent that the above deceleration control circuit, when operative, renders return movement of the master switch toward off position effective to sequentially energize these branches, thereby to sequentially close the secondary contactors 31—34. Thus, since the deceleration control circuit is operative during dynamic braking, it follows that return of the master switch toward off position during dynamic braking is effective to sequentially close the secondary contactors thereby progressively dynamically braking the motor 10.

*Maximum rate of retardation circuit*

Another important circuit contained in my control system is the "maximum rate of retardation" circuit which extends from supply line 48 to supply line 49 by a path including 126, 54e, 127, 77a, 128, 83, 129, 78a, 130, 131, 79b, 92, the coil of braking relay 76, and 93. This circuit has particular importance under those operation conditions in which the engineer obtains his dynamic braking by a very rapid movement of the master switch toward "off" position. Under such conditions, this circuit insures that no less than a predetermined period of time elapses between the closing operations of the successive secondary contactors 31—34 and, more particularly, insures that the time-delay period for each of the braking relays 78—76 does not begin before expiration of the time delay period for the immediately prior braking relay. For example, until braking relay 79 times out to open its contacts 79b, the next succeeding braking relay 78 remains energized and, thus, cannot begin its time-delayed drop out period. Similarly, until braking relay 78 times out to open its contacts 78a, the next succeeding braking relay 77 remains energized and, thus cannot begin its time delayed drop out period. Similarly, until braking relay 77 times out to open its contacts 77a, the next succeeding braking relay 76 remains energized and, thus, cannot begin its time-delayed drop out period.

*Hoisting operation*

Figure 2:
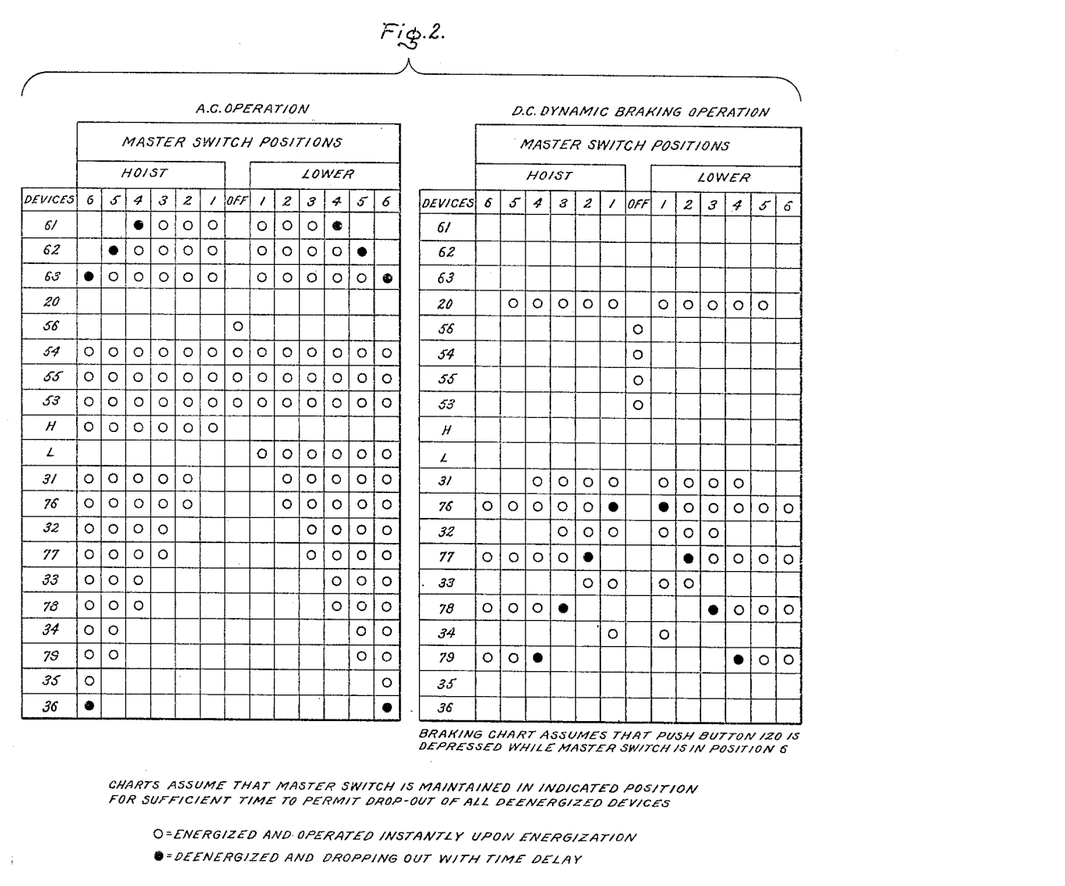
Fig. 2 is a sequence table showing the sequence of operation for the various control devices of the system of Fig. 1.

Since, as is illustrated by the sequence chart of Fig. 2, the hoisting control provided by the motor control system corresponds in its significant features to the above described lowering control, detailed description of the hoisting operation is believed to be unnecessary. Hoisting is obtained simply by moving the master switch 37 in a reverse direction to the movement required for lowering. Reduced motoring effort, coasting, and dynamic braking are each obtained by operating the push-button 120 or the master switch 37, or both, in a manner corresponding to that described for obtaining these functions during lowering. For example, reduced motor effort during hoisting is obtained by returning master switch 37 from its operating position toward "off" position. Coasting may be achieved in position 6—hoist simply by depressing push-button 120. Dynamic braking control may be achieved by depressing button 120 and simultaneously returning the master switch toward "off" position.

The essential difference in the control system during the hoisting and lowering operations is that during hoisting the contactor H is operated instead of the contactor L, which was operated during lowering. Operation of the contactor H provides primary connections to the motor terminals 15, 16, 17 which are reversed from those connections obtained by operation of L contactor. As a result, the motor is driven in a hoisting direction which is opposite to the direction of drive during lowering.

In a manner corresponding to that described for the contactor L, the contactor H is energized and picked up in the first position of the master switch by the closing of cam switch 40. Such closing is effective to complete for the coil of contactor H an energizing circuit which extends from one supply line 48, through 57, 54a, 58, 40, 150, Lf, 20f, 151, the coil of contactor H, 152, to the other supply line 49.

As may be seen from the sequence table of Fig. 2, all of the other relays and contactors respond to master switch movement in the same manner during hoisting as during lowering.

While I have shown and described a preferred embodiment of my invention, it will be obvious to those skilled in the art that various changes and modifications may be made without departing from my invention in its broader aspects. For example, while in the preferred embodiment, I have utilized the braking contactor 20 to connect the motor in a D.-C. dynamic braking circuit, it will be apparent that this contactor could be used instead to connect the motor in some other suitable form of dynamic braking circuit, e. g., to connect the winding 11 to a suitable A.-C. dynamic braking source. I, therefore, aim in the appended claims to cover all such changes and modifications as fall within the true spirit and scope of my invention.

What I claim as new and desire to secure by Letters Patent of the United States is:

1. In a control system for an A.-C. motor, means for selectively exciting said motor from a D.-C. dynamic braking source, means including a series of normally open contactors sequentially closable to accelerate said motor during A.-C. excitation and to progressively brake said motor during D.-C. excitation, a master switch forwardly movable from an "off" position to an operating position to effect sequential closing of said contactors during A.-C. excitation, transfer means selectively operable to collectively open said contactors and to connect the motor to the D.-C. source of excitation, a series of dynamic braking relays, means for sequentially picking up said dynamic braking relays in response to movement of said master switch in a forward direction and for sequentially dropping out said dynamic braking relays in response to return movement of the master switch toward "off" position, a normally-inoperative deceleration control circuit effective when operative to sequentially close said contactors in response to sequential drop-out of said braking relays, and means responsive to selective operation of said transfer means for rendering said deceleration control circuit operative, whereby return movement of said master switch toward "off" position during D.-C. excitation effects sequentially closing of said contactors.

2. In a control system for an induction motor having a primary winding, means for exciting said winding from an A.-C. source, a dynamic braking circuit selectively connectable with said winding to dynamically brake said motor, a series of contactors each having normally-open contacts and a coil energizable to close said contacts, a circuit having series of normally de-energized branches each of which contains a different one of the energizing coils of said contactors, means for accelerating said motor in response to closing of said contacts, means including a master switch forwardly movable from an "off" position to an operating position to sequentially energize said branches whereby to sequentially close said contacts, transfer means selectively operable to connect said primary winding in said dynamic braking circuit and to collectively de-energize said branches thereby to open said contacts, a series of dynamic braking relays, means for picking up said dynamic braking relays in response to movement of said master switch in a forward direction and for sequentially dropping out said dynamic braking relays in response to return movement of the master switch toward "off" position, a normally-inoperative deceleration control circuit effective when operative to sequentially energize said branches in response to sequential drop-out of said braking relays, and means responsive to selective operation of said transfer means for rendering said deceleration control circuit operative, whereby return movement of said master switch toward "off" position during dynamic braking effects sequential closing of said contacts.

3. In combinatiin, an induction motor having a primary winding, means for exciting said winding from an A.-C. source, a dynamic braking circuit connectable with said winding to dynamically brake said motor, a series of contactors sequentially actuable to accelerate said motor during A.-C. excitation and sequentially actuable to progressively brake said motor during dynamic braking, means including a master switch forwardly movable from an "off" position to an operating position to sequentially actuate said contactors during A.-C. excitation, transfer means selectively operable to collectively deactuate said contactors and to connect the primary winding with said dynamic braking circuit, a series of dynamic braking relays, means for sequentially operating said dynamic braking relays in response to movement of said master switch in a forward direction and for sequentially reverse-operating said dynamic braking relays in response to return movement of the master switch toward "off" position, a normally inoperative deceleration control circuit effective when operative to produce sequential actuation of said contactors in response to sequential reverse-operation of said braking relays, and means responsive to selective operation of said transfer means for rendering said deceleration control circuit operative, whereby return movement of said master switch toward "off" position during dynamic braking effects sequential actuation of said contactors.

4. In a control system for an induction motor having a winding, means for exciting said winding from an A.-C. source, means selectively-operable to dynamically brake said motor, means including a series of contactors actuable in a predetermined sequence to accelerate said motor during normal A.-C. excitation and actuable in the same predetermined sequence to progressively brake said motor during dynamic braking, a master switch forwardly movable from an "off" position through a series of operating positions, means responsive to said master switch movement for sequentially actuating said contactors during A.-C. excitation in said predetermined sequence, and means responsive to return movement of said master switch toward "off" position during dynamic braking for sequentially actuating said contactors in said predetermined sequence.

5. In a control system for a motor having a winding, means for exciting said winding from an A.-C. source, means selectively operable to dynamically brake said motor, means including a series of contactors actuable in a predetermined sequence to accelerate said motor during normal A.-C. excitation and actuable in the same predetermined sequence to progressively brake said motor during dynamic braking, means including a master switch forwardly movable from an "off" position into a zone at one side thereof to cause said motor to operate in one direction and forwardly movable from said "off" position into a zone at the other side thereof to cause said motor to operate in a reverse direction, means responsive to forward movement of said master switch into either of said zones for sequentially actuating said contactors in said predetermined sequence, and means responsive to return movement of said master switch toward "off" position during dynamic braking for actuating said contactors in said predetermined sequence.

6. In a control system for an A.-C. motor provided with means for selectively exciting said motor from a D.-C. dynamic braking source, means including a series of contactors sequentially closable to accelerate said motor during A.-C. excitation and sequentially closable to progressively brake said motor during D.-C. excitation, a master switch forwardly movable from an "off" position to an operating position, means responsive to said master switch movement for sequentially closing said contactors during A.-C. excitation, transfer means selectively operable to collectively open said contactors and to connect the motor to the D.-C. source of excitation, a dynamic braking relay, means for picking up said dynamic braking relay in response to movement of said master switch in a forward direction and means for dropping out said dynamic braking relay in response to return movement of the master switch toward "off" position, a normally-inoperative control circuit effective when operative to sequentially close said contactors in response to drop out of said braking relay, and means responsive to selective operation of said transfer means for rendering said control circuit operative, whereby return movement of said master switch toward "off" position during D.-C. excitation effects sequential closing of said secondary contactors.

7. In a control system for an induction motor having a primary winding, means for supplying power to said winding from a source of alternating current, means including a series of secondary contactors sequentially closable to vary the speed of the said motor, a reversibly movable master switch forwardly movable from an "off" position to an operating position, means responsive to said forward movement for sequentially closing said secondary contactors, a braking contactor actuable to connect said primary winding in a dynamic braking circuit; control relay means selectively operable to collectively effect the following operations: (i) disconnection of said primary winding from said A.-C. source (ii) collective opening of said secondary contactors (iii) provision of a control circuit effective when operative to actuate said braking contactor; a blocking relay normally disabling said control circuit, means responsive to initial return movement of said master switch toward "off" position for rendering said blocking relay ineffective to disable said control circuit whereby said initial return movement effects actuation of said braking contactor, and means responsive to further return movement of said master switch toward "off" position to sequentially close said secondary contactors whereby to progressively brake said motor.

8. In a control system for an induction motor having a primary winding, means for exciting said winding from an A.-C. source, means including a series of contactors sequentially closable to accelerate said motor during A.-C. excitation, a master switch forwardly movable from an "off" position through a series of operating positions, means responsive to said forward movement for sequentially closing said contactors during A.-C. excitation, a dynamic braking circuit connectable with said winding thereby to dynamically brake said motor, transfer means selectively operable to collectively open said contactors and to connect said winding in said dynamic braking circuit, a series of braking relays, at least one of said relays having a definite time-delay drop-out characteristic, means for sequentially picking up said braking relays in response to movement of said master switch in a forward direction and for sequentially dropping out said braking relays in response to return movement of master switch toward "off" position, a normally inoperative deceleration control circuit effective when operative to produce sequential closing of said contactors in response to sequential drop-out of said braking relays, and means responsive to selective operation of said transfer means for rendering said deceleration control circuit operative, whereby return movment of said master switch toward "off" position during dynamic braking effects sequential closing of said contactors.

9. The control system of claim 8 in combination with a maximum rate of retardation circuit established by pick up of said braking relays, said circuit being arranged to supply control power to at least one of said series of braking relays until the expiration of the time-delay drop-out period for the immediately preceding braking relay, whereby to limit the rate at which the contactors close in response to said return movement of the master switch toward "off" position.

10. The combination of claim 9 in which said preceding braking relay has contacts operable upon drop out of said preceding relay to interrupt the flow of control power through said maximum rate of retardation circuit to said one braking relay.

11. In a control system for an induction motor excitable from an A.-C. source, transfer means selectively operable to dynamically brake said motor, means including a series of contactors sequentially actuable from inoperative into operative positions to accelerate said motor during A.-C. excitation and to progressively brake said motor during dynamic braking, means including a reversibly-movable master switch forwardly movable from an "off" position through a series of operating positions to sequentially actuate said contactors into said operative positions, means responsive to selective operation of said transfer means for collectively deactuating said contactors into said inoperative positions, and decelerating means responsive to return movement of said master switch toward "off" position during dynamic braking for sequentially actuating said contactors into said operative positions.

12. In combination, an induction motor having a winding, means for exciting said winding from an A.-C. source, a dynamic braking circuit connectable with said winding to dynamically brake said motor, a series of contactors sequentially actuable from inoperative into operative positions to accelerate said motor during A.-C. excitation and sequentially actuable from inoperative into operative positions to progressively brake said motor during dynamic braking, means including a master switch forwardly movable from an "off" position into a zone at one side thereof to cause said motor to operate in one direction and forwardly movable from said "off" position into a zone at the other side thereof to cause said motor to operate in a reverse direction, means responsive to forward movement of said master switch to either of said zones for sequentially actuating said contactors into said operative positions, transfer means selectively operable to collectively deactuate said contactors and to connect said winding with said dynamic braking circuit, a series of braking relays, means for sequentially picking up said braking relays in response to movement of said master switch in a forward direction into either of said zones and for sequentially dropping out said braking relays in response to return movement of the master switch toward "off" position, a deceleration control circuit effective when operative to produce sequential actuation of said contactors in response to sequential drop-out of said braking relays, and means responsive to selective operation of said transfer means for rendering said control circuit operative, whereby return movement of said master switch toward "off" position during dynamic braking effects sequential actuation of said contactors.

13. In a control system for an induction motor excitable from an A.-C. source, transfer means selectively operable to dynamically brake said motor, means including a series of contactors sequentially actuable from inoperative into operative positions to accelerate said motor during A.-C. excitation and to progressively brake said motor during dynamic braking, means including a master switch forwardly movable from an "off" position into a zone at one side thereof to cause said motor to operate in one direction and forwardly movable from said "off" position into a zone at the other side thereof to cause said motor to operate in a reverse direction, means responsive to forward movement of said master switch into either of said zones for sequentially actuating said contactors into said operative positions, means responsive to selective operation of said transfer means for collectively deactuating said contactors into said inoperative positions, and decelerating means responsive to return movement of said master switch toward "off" position during dynamic braking for sequentially actuating said contactors into said operative positions.

14. In combination, a motor having a primary winding and a secondary winding, means for supplying power to said primary winding from a source of alternating current, a resistor in circuit with said secondary winding and variable to vary the speed of said motor, a reversibly-movable master controller forwardly movable from an "off" position through a series of operating positions, means including a series of secondary contactors sequentially closable to decrease said resistance in response to movement of said controller from its "off" position through said series of operating positions whereby to accelerate said motor, a dynamic braking circuit for said motor, a braking contactor actuable to connect said primary winding in said dynamic braking circuit, control relay means selectively-operable to collectively open said contactors and disconnect said primary winding from the A.-C. source, a normally-disabled circuit made operative by the operation of said control relay means for rendering initial reverse movement of said controller from one of its operating positions effective to actuate said braking contactor whereby to connect said primary winding in said braking circuit, and means made operative by the operation of said control relay means for rendering continued reverse movement of said controller toward "off" position effective to progressively dynamically brake said motor.

15. In combination a motor having a primary winding and a secondary winding, means for supplying power to said primary winding from a source of alternating current, a resistor in circuit with said secondary winding and variable to vary the speed of said motor, a single reversible-movable master switch forwardly movable from an off position to an operation whereby to decrease the resistance of said resistor thereby accelerating said motor, a dynamic braking circuit for dynamically braking said motor, a braking contactor actuable to connect said primary winding in said braking circuit whereby to dynamically brake said motor, control relay means selectively operable to effect disconnection of said primary winding from said alternating current source and to provide a control circuit effective when operative to actuate said braking contactor, a blocking relay normally disabling said control circuit, and means responsive to return movement of said master switch toward "off" position for rendering said blocking relay ineffective to disable said control circuit, whereby said return movement of said master switch effects actuation of said braking contactor.

16. In a control system for an alternating current induction motor having primary and secondary windings, resistance means connected in circuit with said secondary winding, normally open switching means sequentially operable progressively to short circuit said resistance means, a single manually operable speed controller movable from an "off" position through a plurality of operating positions to a "full-on" position, means operable by said controller in movement toward said "full-on" position to sequentially actuate said switching means to control acceleration of said motor, manually operable means operable when said controller is removed from said "off" position to simultaneously de-energize all said switching means actuated during a preceding motor acceleration, and means operable by said controller in subsequent movement toward said "off" position to sequentially actuate said switching means to control braking of said motor.

17. In a control system for an alternating current induction motor having primary and secondary windings, first switching means for alternatively connecting said primary winding to sources of alternating current or direct current supply, resistance means connected in circuit with said secondary winding, a plurality of normally-open switching means sequentially operable progressively to short circuit said resistance means, a single manually operable speed controller movable from an "off" position through a plurality of operating positions to a "full-on" position, means operable by said controller in movement from said "off" position toward said "full-on" position to actuate said first switching means for supply of alternating current to said primary winding and to sequentially actuate said plurality of normally open switching means to accelerate said motor, manually operable means operable when said controller is removed from said "off" position to simultaneously de-energize all said normally open switching means actuated during a preceding motor acceleration, and means operable by said controller in subsequent movement toward "off" position to actuate said first switching means for supply of direct current to said primary winding and to sequentially actuate said normally open switching means to control the dynamic braking of said motor.

No references cited.